US005922058A

United States Patent [19]

Fishman et al.

[11] Patent Number: 5,922,058

[45] Date of Patent: Jul. 13, 1999

[54] OPTICAL TRANSMISSION SYSTEM FOR GENERATING FIRST-EDGE-BASED SERIAL DATA BIT STREAM BY INVERTING CONTROL OUTPUT LINE AT MARK TIMES

[75] Inventors: Neil S. Fishman, Bothell, Wash.; Walter Helm, Farmington; Victor Shiff, Wolcott, both of Conn.

[73] Assignees: Microsoft Corporation, Redmond, Wash.; Timex Corporation, Middlebury, Conn.

[21] Appl. No.: 08/938,421

[22] Filed: Sep. 25, 1997

Related U.S. Application Data

[62] Division of application No. 08/669,783, Jun. 26, 1996, Pat. No. 5,771,399.

[51] Int. Cl.[6] .............. G06F 13/10

[52] U.S. Cl. .............. 710/72; 710/62; 359/189

[58] Field of Search .............. 395/821, 114; 364/700; 710/72, 74, 62; 359/189

[56] References Cited

U.S. PATENT DOCUMENTS

| | | | |
|---|---|---|---|
| 4,534,012 | 8/1985 | Yokozawa | 364/900 |
| 4,855,725 | 8/1989 | Fernandez | 345/173 |
| 4,999,617 | 3/1991 | Uemura et al. | 340/706 |
| 5,307,297 | 4/1994 | Iguchi et al. | 364/708.1 |
| 5,488,571 | 1/1996 | Jacobs et al. | 364/705.07 |
| 5,495,358 | 2/1996 | Bartig et al. | 359/189 |
| 5,561,282 | 10/1996 | Price et al. | 235/380 |
| 5,768,627 | 6/1998 | Jones et al. | 395/880 |
| 5,774,637 | 6/1998 | Haber et al. | 395/114 |

*Primary Examiner*—Thomas C. Lee
*Assistant Examiner*—Harold Kim
*Attorney, Agent, or Firm*—Lee & Hayes, PLLC

[57] ABSTRACT

Described herein is a system for transferring a binary data stream in a serial edge-based transmission format between a computer and a portable device such as the Timex® Data-Link™ watch. In the edge-based format expected by the Data-Link™ watch, individual data bits have first and second binary values which are represented by the presence or absence of signal edges at mark times which occur at a pre-selected bit rate. The system includes a computer having a digital output line which can be turned on and off by the computer at any time. The computer also has an internal timer which is programmed to generate timing signals at a frequency which is an integer multiple n of the pre-selected bit rate. An LED is operably connected to the digital output line so that the computer can switch the LED on and off at any time through the digital output line. An application program runs on the computer. The application program monitors the timing signals to transmit individual data bits of the binary data stream at corresponding $n^{th}$ timing signals. Specifically, the application program turns the LED on to create an optical signal edge at a particular $n^{th}$ timing signal if and only if the data bit corresponding to said particular $n^{th}$ timing signal has a '0' value. The application program then monitors the timing signals to turn the LED back off at an intermediate timing signal which occurs after said particular $n^{th}$ timing signal but before the next $n^{th}$ timing signal. The disclosed embodiment of the system includes a light wand having a distal end which is shaped to register against the face of the receiving watch. This aids the user in aligning the LED with the receiving sensor of the watch.

26 Claims, 9 Drawing Sheets

OPTICAL TRANSMISSION SYSTEM FOR GENERATING FIRST-EDGE-BASED SERIAL DATA BIT STREAM BY INVERTING CONTROL OUTPUT LINE AT MARK TIMES

RELATED APPLICATIONS

This is a divisional of U.S. patent application Ser. No. 08/669,783, which was filed Jun. 26, 1996, now U.S. Pat. No. 5,771,399.

TECHNICAL FIELD

This invention relates to systems and methods for transferring a binary data stream in a serial edge-based transmission format between a computer and a portable information device using a peripheral device interface of a desktop computer.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to handheld calculators. They have a full input keyboard with both numeric keys and alphabet keys, as well as special finction keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only four to six input buttons. A wearer programs a watch by depressing one or more buttons several times to cycle through various menu options. Once an option is selected, the user depresses another button or buttons to input the desired information. These input techniques can be inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows™ which maintains daily appointment schedules, to-do lists, personal notes, and calendar planning. This information is often a duplicate of that maintained on the portable personal organizer.

Timex Corporation of Middlebury, Conn., has recently introduced the Timex® Data-Link™ watch. This watch utilizes new technology for transferring information from a personal computer to a watch. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is normally used to provide light pulses to the watch. Although it appears to a human viewer that all pixels of a CRT are illuminated simultaneously, the pixels are actually illuminated individually, one at a time, by an electron beam which sequentially scans each row or raster line of pixels beginning with the top raster line and ending with the bottom raster line. It is this characteristic of a CRT and of other line-scanning display devices which is utilized to transmit serial data to the Data-Link™ watch.

To transfer data to the watch, the watch is held near and facing the CRT. The computer is programmed to display a sequence of display frames in which spaced data transmission raster lines represent individual bits of data. Lines are illuminated or not illuminated, depending on whether they represent binary '0' bits or binary '1' bits. Each line appears as a continuous light pulse of a finite duration to the receiving watch. The watch recognizes an illuminated line as a binary '0' bit. It recognizes a non-illuminated line as a binary '1' bit. Generally, integral numbers of "words" of ten bits are transmitted in a single CRT display frame: eight data bits, a start bit, and a stop bit. As used herein, the term "display frame" means a single screen-size image made up of a matrix of pixels which form a plurality of raster lines. A display frame is generally created by sequentially illuminating or refreshing the raster lines of the display device.

FIG. 1 shows a system 10 as described above. System 10 includes a computer or computer system 11 and a portable or external information receiving device in the form of programmable Data-Link™ watch 12. Computer 11 includes a frame or raster scanning graphics display device 14, a central processing unit (CPU) 15 having a data processor, memory, and I/O components, and a keyboard 16 (or other input device).

Visual display device 14 is preferably a CRT (cathode ray tube) monitor such as commonly used in personal desktop computers. The graphics display device displays sequential display frames containing graphical images on its monitor screen 22. A "display frame" or "frame" means- a single, two-dimensional, screen-size image made up of a matrix of pixels. The pixels form a plurality of available raster lines for each display frame.

The individual pixels and raster lines of a CRT are illuminated individually by an electron beam (i.e., the cathode ray) which sequentially scans each raster line beginning with the top raster line and ending with the bottom raster line. The beam is deflected horizontally (in the line direction) and vertically (in the field direction) to scan an area of the screen to produce a single display frame. The electron beam strikes phosphors positioned at the screen of the CRT monitor to cause them to glow. The phosphors are arranged according to a desired pixel pattern, which is customarily a matrix of rows and columns. Conventional color VGA monitors typically have a resolution of 640×480 pixels or better. The process of scanning all raster lines a single time and returning the electron beam from the bottom to the top of the display is referred to as a "frame scan."

The linear scanning electron beam of CRT 14 is utilized to transfer a binary data stream between computer 11 and watch 12. Specifically, computer 11 uses selected, spaced raster lines of CRT 14 for serial bit transmission to watch 12. Application software loaded in CPU 15 generates a sequence of display frames having changing patterns of raster lines that are displayed on CRT 14. The lines appear at watch 12 as a series of optical pulses. Watch 12, through optical sensor 13, monitors the illumination of the raster lines of the sequential display frames to reconstruct the transmitted data.

FIG. 2 shows a specific pattern of selected and spaced raster lines used to transmit data to watch 12. Assuming that each frame transmits a single 8-bit byte with start and stop bits, ten raster lines 30(1)–30(10) (out of a much larger total number of available raster lines) are selected for transmitting data. These raster lines will be referred to herein as "data transmission raster lines," as opposed to other, intervening raster lines which will be referred to as "unused raster lines." Solid lines in FIG. 2 represent data transmission raster lines which are illuminated. Dashed raster lines in FIG. 2 represent data transmission raster lines which are not illuminated. Each data transmission raster line position conveys one data bit of information. Bits having a first binary value, such as a value '0', are represented by illuminated data transmission lines (e.g., lines 30(1), 30(2), 30(4), and 30(7)–30(9)) and bits having a second binary value, such as a value '1', are represented by non-illuminated data transmission lines (as illustrated pictorially by the dashed lines 30(3), 30(5), 30(6), and 30(10)). The data transmission raster lines are spaced at selected intervals, with intervening unused or non-selected raster lines, to produce a desired temporal spacing appropriate for the data receiving electronics of watch 12.

For each programming instruction or data to be transmitted to the watch, the software resident in the CPU 15 causes the CRT monitor 14 to selectively illuminate the appropriate data transmission raster lines representing '0' bits by scanning the associated pixels. The selected data transmission lines that represent '1' bits are left non-illuminated. The middle eight lines 30(2)–30(9) represent one byte of programming information being optically transmitted to watch 12. Top line 30(1) represents a start bit and bottom line 30(10) represents a stop bit that are used for timing and error detection. Because of the scanning nature of the cathode ray of CRT monitor 14, these patterns produce a serial light emission from CRT monitor 14 which is representative of a serial bit stream. Each display frame in FIG. 2 represents one byte. A new line grouping is presented for each sequential display frame so that each such display frame represents a different data byte. Two or more bytes could optionally be transmitted in each display frame.

The display of FIG. 2 implements a serial, edge-based, optical transmission format as shown by example signal 29 in the timing diagram of FIG. 3, in which the horizontal direction indicates time and the vertical direction indicates optical signal intensity. Individual bits of the transferred binary data stream have first and second binary values which are represented in this transmission format by the presence or absence of optical signal edges at what are referred to herein as "mark times" 32(1)–32(9). The mark times are specified to occur at a pre-selected bit rate such as 1024 bits/second or 2048 bits/second. They are represented in FIG. 3 by the vertical arrows beneath signal 29. To work with the current implementation of the Data-Link™ watch, the pre-selected bit rate should be approximately equal to 2048 bits/second.

This type of signal has the characteristic of returning to a "low" value before every transmitted bit. This type of transmission format is necessitated by the nature of a scanning device such as CRT 14. The longest continuous optical pulse duration which can be generated with CRT 14 is the that of a horizontal raster line. This is because the electron beam of the CRT is deactivated between lines. The duration of a single raster line is significantly less than the time between mark times at practical bit rates.

The start bit of a single byte is represented in FIG. 2 by illuminated horizontal raster line 30(1). Illuminated raster line 30(1) produces a light pulse 31(1) as shown in FIG. 3 of a relatively short duration. The rising edge of light pulse 31(1) occurs at a first mark time 32(1). The first bit of the transmitted byte is a "0", and is represented in FIG. 2 by illuminated horizontal raster line 30(2). Illuminated raster line 30(2) produces a light pulse 31(2) (FIG. 3); The rising edge of light pulse 31(2) occurs at a second mark time 32(2). The second bit of the transmitted byte is a "1", and is represented in FIG. 2 by non-illuminated horizontal raster line 30(3). Non-illuminated raster line 30(3) produces no light pulse and no rising edge at the third mark time 32(3). The third bit of the transmitted byte is a "0", and is represented in FIG. 2 by illuminated horizontal raster line 30(4). Illuminated raster line 30(4) produces a light pulse 31(4). The rising edge of light pulse 31(4) occurs at a fourth mark time 32(4). The remaining bits of the byte are transmitted in a similar manner, followed by a stop bit which is represented by non-illuminated raster line 30(1).

FIG. 4 shows an external face of programmable watch 12, which is illustrated for discussion proposes as the Timex® Data-Link™ watch. Other watch constructions as well as other portable information devices can be used in the context of this invention. Watch 12 includes a small display 33 (such as an LCD), a mode select button 34, a set/delete button 36, next/previous programming buttons 38 and 40, and a display light button 42. Optical sensor 13 is positioned adjacent to display 32. In the programming mode, display 32 indicates the programming option, and what data is being entered therein. During the normal operational mode, display 32 shows time of day, day of week, or any other function common to watches.

Referring now to FIG. 5, watch 12 includes a CPU (Central Processing Unit) 68 for performing data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM 74 is provided to temporarily store data used by display driver 76 to depict visual information on display 32. These components can be incorporated into a single microprocessor-based integrated circuit. One appropriate microprocessor IC is available from Motorola Corporation as model MC68HC05HG.

Watch 12 has an optical sensor 13 which is coupled to a digital serial receiver or UART 60. UART 60 is a conventional, off-the-shelf circuit which receives data in eight-bit words surrounded by start and stop bits. However, UART 60 must receive a conventional NRZ (non-return to zero) or level-based signal—in contrast to the edge-based signal illustrated in FIG. 3. Therefore, watch 12 includes conversion circuitry 61 to produce a level-based or NRZ serial signal from the edge-based signal generated by computer 11 and CRT 14. Such conversion circuitry consists of a retriggerable monostable oscillator. Conversion circuitry 61 also includes amplifier and filter circuits.

FIG. 6 shows a level-based signal 80 after conversion by conversion circuitry 61. For reference, the edge-based signal 29 of FIG. 3 is shown below level-based signal 80. The initial start bit pulse 31(1) of FIG. 3 is inverted and extended by conversion circuitry 61 until the next mark time. The remaining data bits and stop bit are similarly extended so that signal 80 only changes level when a bit has a different value than the previous bit. This is in contrast to signal 29 of FIG. 3, where the signal always returns to a "low" value before the next bit.

The output of conversion circuitry 61 is fed to UART 60. UART 60 is coupled to an internal bus 62, which is preferably an eight-bit bus. Inputs received from the control buttons on the watch, referenced generally by box 64, are detected and deciphered by button control circuit 66 and placed on bus 62.

To program the watch, the computer is first loaded with a compatible time management software and optical pattern generating software. One example time management software is Microsoft's® Schedule+™ for Windows™ and a suitable optical pattern generating software is Timex® Data-Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 13 in juxtaposition with monitor screen 22. A sequence of changing optical patterns having horizontal contiguously-scanned lines begin to flash across the monitor screen as shown in FIG. 3 to optically transmit data regarding the various appointments and tasks. In about 20 seconds, the system will have transmitted as many as 70 entries, including the birthday reminder. These entries are kept in data RAM 72.

The system described above is extremely convenient and easy to use. However, it does have a significant drawback in that it cannot be used with some types of computer displays. Specifically, LCD screens do not generate light pulses which can be sensed by the optical sensor of the Data-Link™ watch. Accordingly, another method must be used to program the watch from laptop computers which use non-scanned displays.

It has been contemplated that communication from such computers to the Data-Link™ watch could be accomplished LED's with (light-emitting diodes) connected to the serial printer interfaces of the computers. However, this would require special conversion circuitry to convert the level-based serial signal produced by a serial printer interface to the edge-based serial format expected and required by the Data-Link™ watch. It would be desirable to eliminate the need for such special conversion circuitry. Another problem with the previously-contemplated approach is that users might have difficulty in correctly positioning the LED relative to the watch and in signaling the computer when alignment has been achieved. Again, it would be desirable to eliminate this concern.

SUMMARY OF THE INVENTION

The invention described below utilizes the peripheral device interface of a computer, in conjunction with an internal timer of the computer, to produce an edge-based serial signal such as illustrated in FIG. 3 without requiring conversion circuitry. In the embodiment disclosed herein, the computer programs its internal timer to generate timing signals at a frequency which is an integer multiple n of the desired bit rate, wherein every $n^{th}$ timing signal occurs at a mark time. A light emitting element such as an LED is connected to a bit output line of the peripheral device interface so that the computer can switch the light emitting element between on and off states at any time through the output line. An application program monitors the timing signals and transmits individual data bits of a binary data stream at corresponding $n^{th}$ timing signals. Specifically, the application program switches the state of the light emitting element from a first to a second of its on and off states to create an optical signal edge at a particular $n^{th}$ timing signal if and only if the data bit corresponding to said particular $n^{th}$ timing signal has the first binary value. The application switches the light emitting element back to its first state at an intermediate timing signal which occurs prior to the next $n^{th}$ timing signal.

Further aspects of the invention include an adapter for connecting the light emitting element to either the parallel or the serial printer interface of a computer without requiring special conversion circuitry. The invention also includes a light wand for aligning the light emitting element with the optical sensor of the receiving watch. The wand has a button which a user can press to signal the computer to begin data transfer.

DETAILED DESCRIPTION

Figure 7:
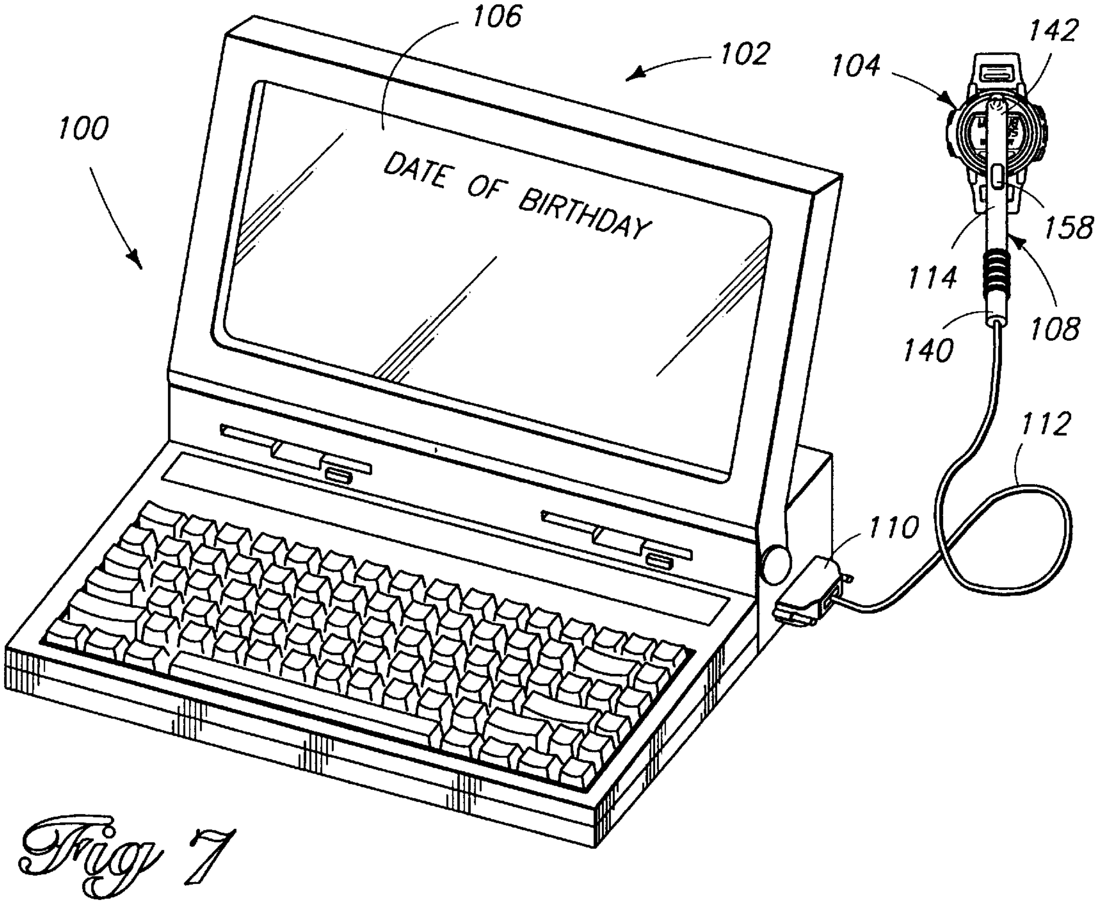
FIG. 7 is a diagrammatic view of a system in accordance with the invention for transferring a binary data stream between a computer and a portable information device.

FIG. 7 shows a system 100 in accordance with an exemplary embodiment of the invention for transferring a binary data stream between a computer 102 and a portable information device 104. As will be further described below, system 100 uses an optical element pair to transfer the binary data stream. Portable information device 104 has a first member of the optical element pair, which is preferably an optical sensor for detecting serially transmitted binary data. The second member of the optical element pair is preferably a light emitting element associated with computer 102 for serially transmitting binary data to portable information device 104.

Computer 102 is a laptop computer having an LCD or other non-scanning screen 106 which is unsuitable for normal transmission of data to portable information device 104. Portable information device 104 is a Timex® DataLink™ watch, which can be configured to fiction as a portable personal information manager. The invention is described herein within the context of a programmable watch. However, other forms of external devices can be used, such as pagers and personal digital assistants (PDA's). As used herein, "portable information device" means a small, portable, electronic apparatus that has limited power resources and limited rewritable memory capacity. The Data-Link™ watch, for example, is presently constructed with a rewritable memory capacity of approximately 1 Kbyte.

Figure 1:
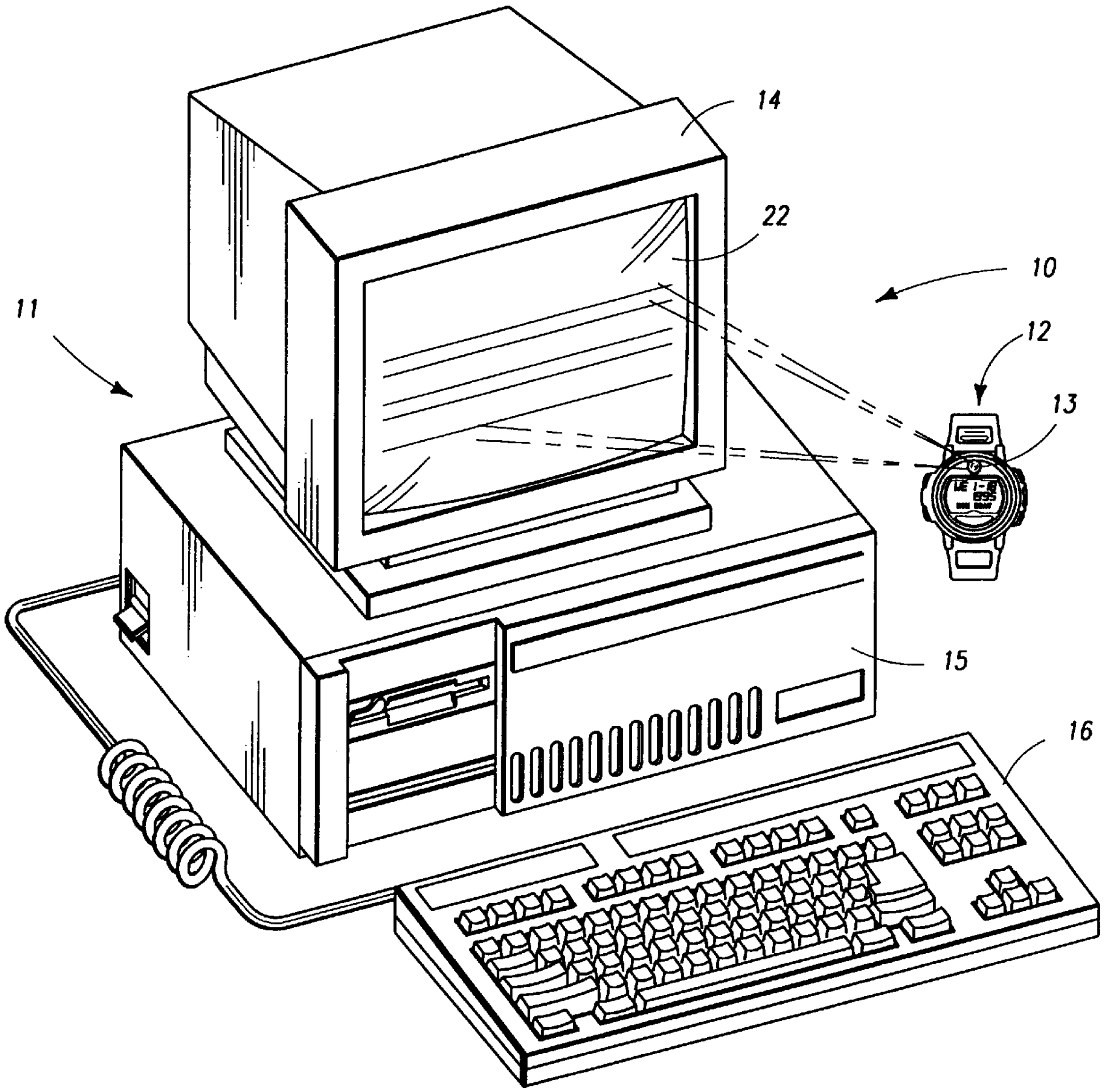
FIG. 1 is a diagrammatic illustration of a system for serially transferring data to a programmable watch from a desk-top computer with a CRT.
Figure 2:
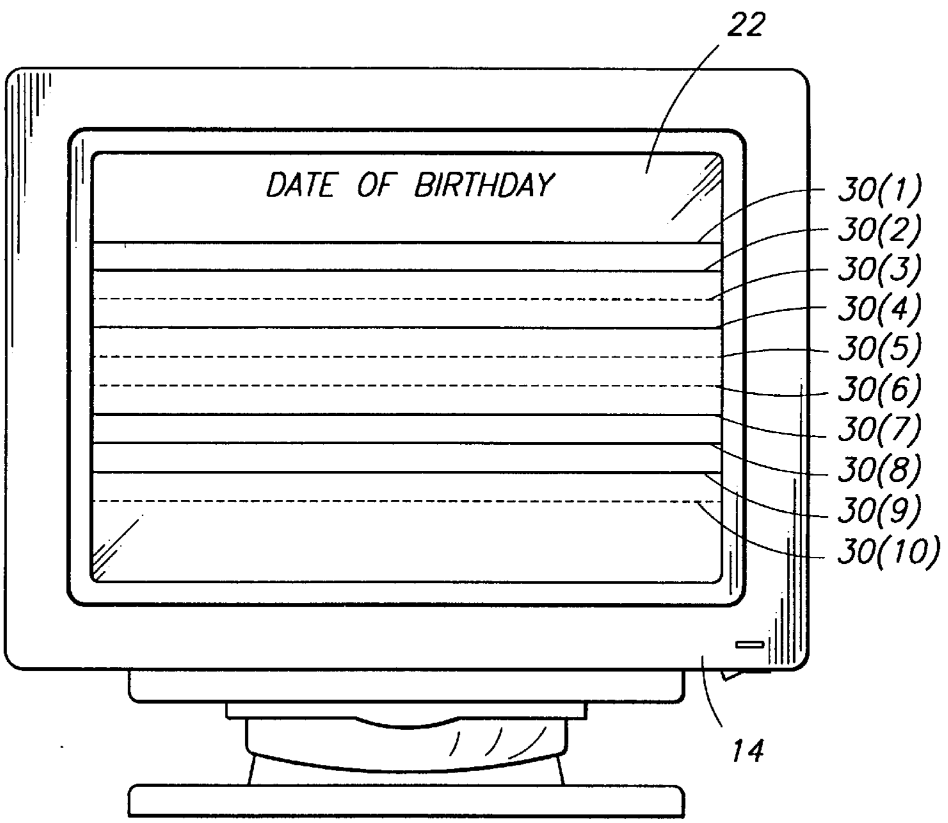
FIG. 2 is diagrammatic front view of a CRT monitor depicting a display frame having contiguously-scanned lines used to convey bits of information to the programmable watch.
Figure 3:
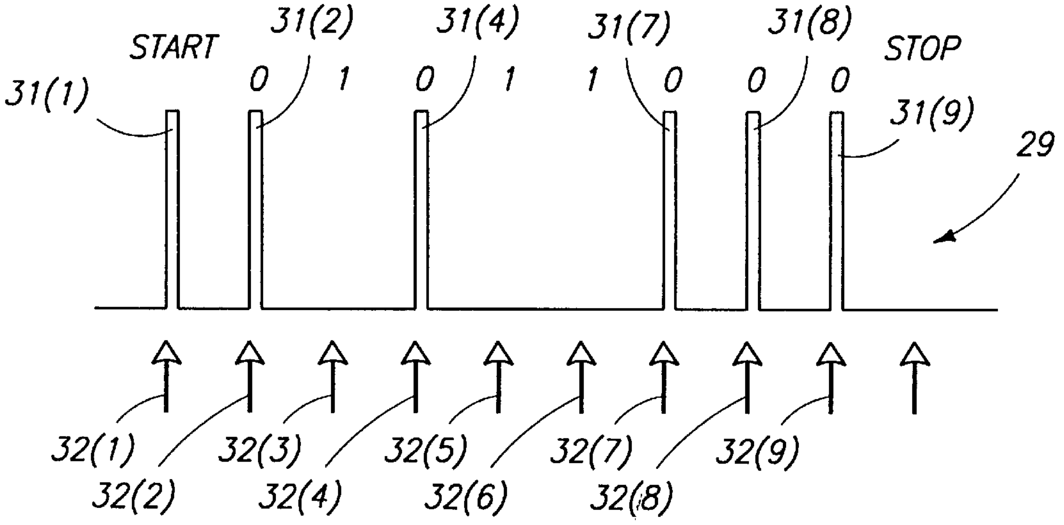
FIG. 3 is a timing diagram showing an optical signal generated by the CRT monitor of FIG. 2.
Figure 4:
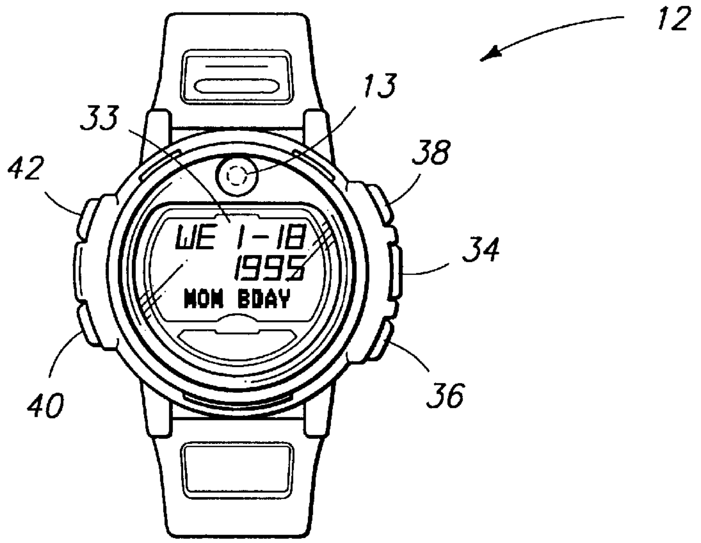
FIG. 4 is a diagrammatic front view of the programmable watch of FIG. 1.
Figure 5:
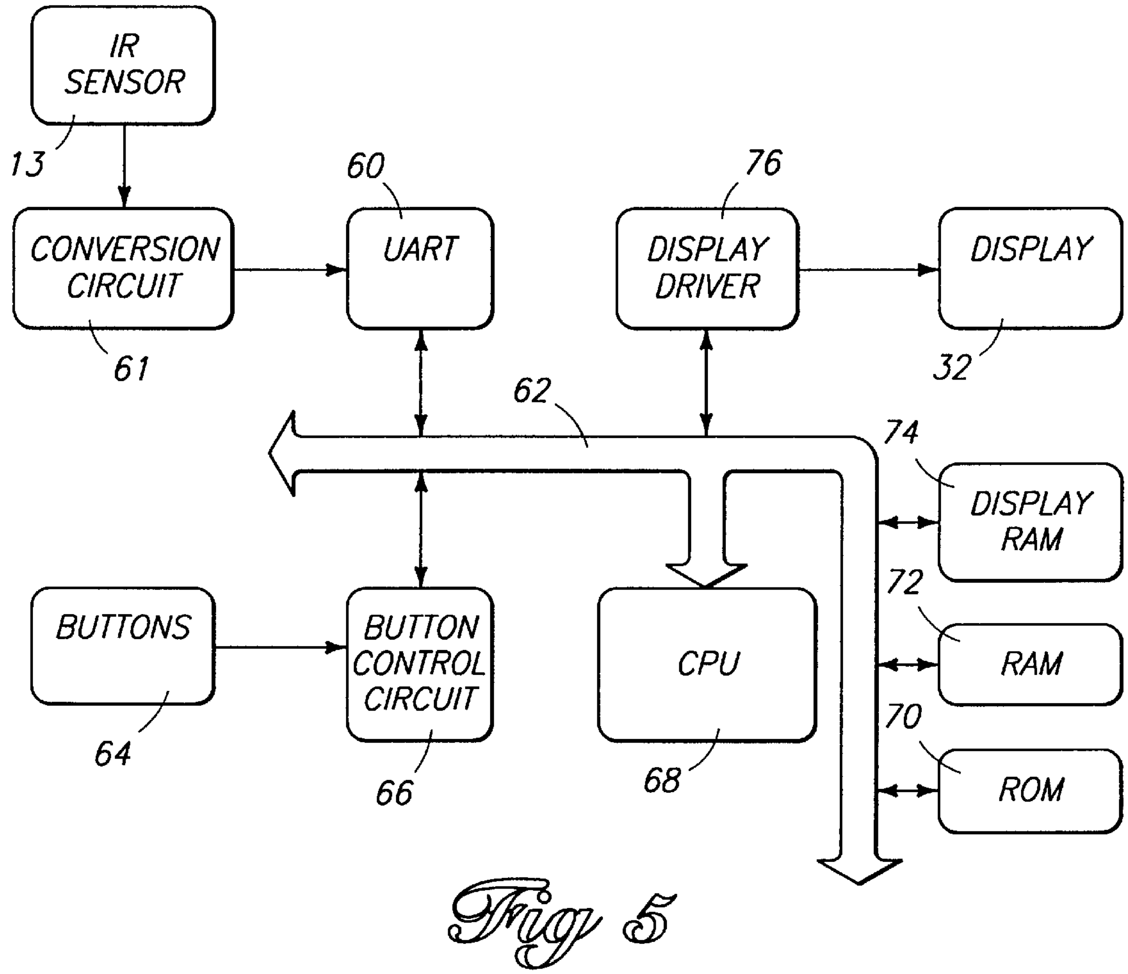
FIG. 5 is a simplified block diagram of the internal components of the programmable watch of FIG. 1.
Figure 6:
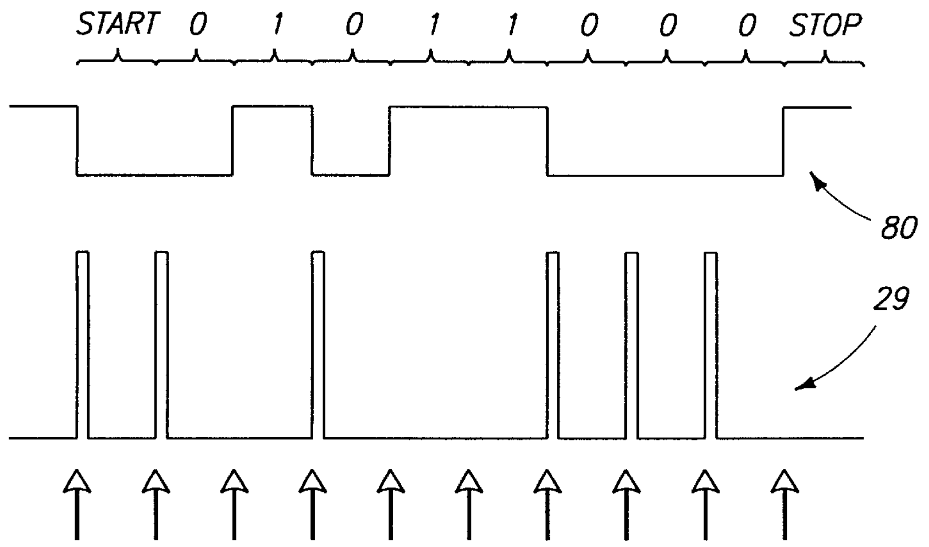
FIG. 6 is a timing diagram of a serial logic signal produced internally by the programmable watch in response to the signal shown in FIG. 3. The optical signal of FIG. 3 is also incorporated in FIG. 6 for purposes of reference.

System 100 includes a light wand 108 which computer 102 uses to produce a serial, edge-based optical signal as described above with reference to FIG. 3. Light wand 108 is used in conjunction with a digital output line of the computer. Specifically, light wand 108 has a light emitting element which connects to and is responsive to a bit output line of the computer. The digital output line is of a type which can be turned on and off by the computer at any time, on a real-time basis. The serial transmit line associated with serial printer interface 128, commonly referred to as the TX line, does not satisfy this criteria—computer 102 cannot control the state of the TX line on a real-time basis. Rather, the TX line is controlled by a UART (universal asynchronous receiver/transmitter). Computer 102 controls the TX line only indirectly by writing bytes to the UART. The UART, in turn, produces an NRZ, level-based, serial signal through the TX line at a bit rate which is controlled by the UART itself in conjunction with an external oscillator. It is not possible for computer 102 to create an edge-based signal, such as shown in FIG. 3, through the TX line of the serial printer interface.

Figure 8:
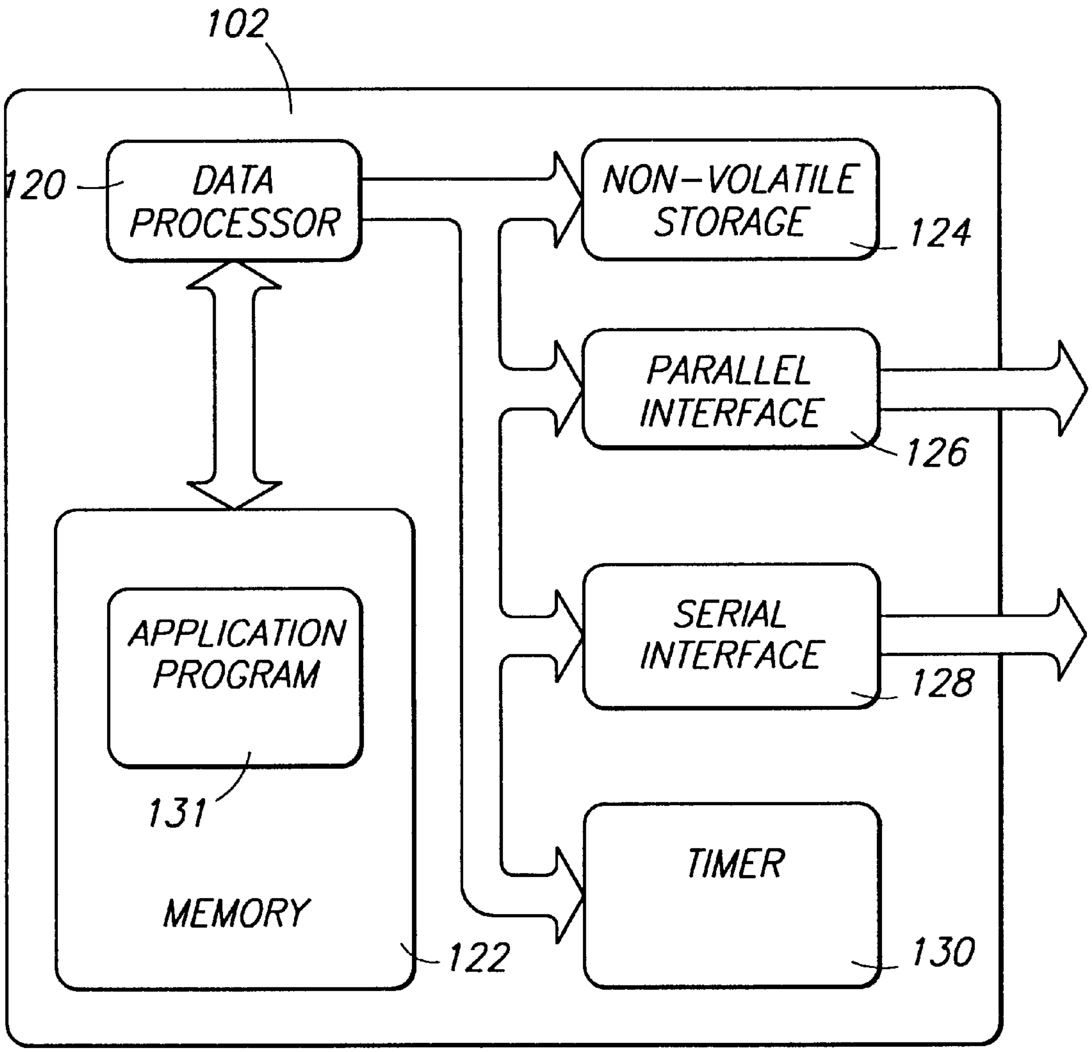
FIG. 8 is a simplified block diagram of a computer such as shown in FIG. 7.
Figure 9:
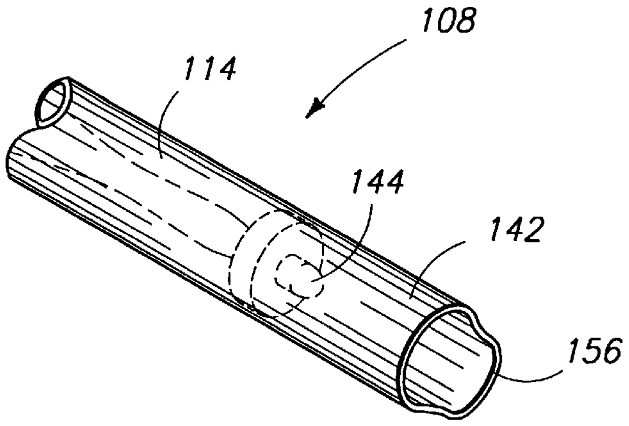
FIG. 9 is a distal-end perspective view of a light wand in accordance with one embodiment of the invention.

FIG. 8 shows pertinent internal components of computer 102, including a data processor 120, volatile program memory 122, non-volatile storage memory 124, and two peripheral device interfaces. In this case, the peripheral device interfaces include a parallel printer interface 126 and a serial printer interface 128. Other types of peripheral device interfaces could also be used, such as a CRT interface. Computer 102 further includes an internal general purpose programmable timer circuit 130 which can be used to generate periodic interrupts or for other purposes by application software running on computer 102. Such a timer is found in most types of desktop or personal computers. The illustrated computer system is an IBM®-compatible system, although other architectures, such as Apple®-compatible systems, can be employed. In IBM®-compatible systems, the internal timer is referred to as an 8253 timer. The 8253 timer actually incorporates three timer circuits. Two are used by the computer's internal operating system, while a third is available for application programs. The features and methods described below utilize this third timer circuit.

Parallel printer interface 126 is of a type commonly found in IBM®-compatible and other systems, popularly referred to as a Centronics-type interface. Serial printer interface 128 is similarly a common feature of desktop computers, and conforms to the RS-232 standard which is well-known in the industry. Each interface is associated with its own electrical connector (not shown) for connection to external devices. Most popular desktop systems, such as the IBM®-compatible system shown, use industry-standard "DB-25" connectors for their parallel and serial interfaces. The parallel printer interface has a plurality of bit lines which can be individually configured as inputs or outputs. The binary state of the bit input lines can be monitored at any time by reading from a control register. The binary state of the bit output lines can similarly be modified at any time by writing to a control register. The serial printer interface has serial transmission and reception lines, referred to respectively as TX and RX lines, as well as a number of control input and output lines. The TX and RX lines cannot be directly modified by computer 102. Rather, they are under control of a UART circuit which normally processes data stream bits at a specified bit rate. The control input and output lines, however, can be monitored and modified at any time by accessing one or more control registers.

Wand 108 is adapted for connection to either parallel printer interface 126 or serial printer interface 128. The digital output line referred to above is either a selected data or control output line of parallel printer interface 126 or a control output line of serial printer interface 128. The LED of wand 108 is operably connected to respond (a) to the selected output line of the parallel printer interface when wand 108 is connected to the parallel printer interface, or (b) to the control output line of the serial printer interface when wand 108 is connected to the serial printer interface. Through this connection, computer 102 is able to switch the LED between on and off states at any time to create an edge-based serial signal at a specified bit rate.

FIGS. 7 and 9–11 show wand 108 in more detail. It comprises an elongated, cylindrical hand-held housing or tube 114 having a proximal end 140 (FIG. 7) and an open distal end 142. A light emitting element or LED 144 is-contained within the tube's distal end 142. LED 144 is operably connected through a flexible cable 112 to an adapter 110 which extends between tube 114 and adapter 110 for connection to a digital output line of the computer. Adapter 110 is a DB-25 Connector which mates with the serial or parallel printer interface connectors of computer 102.

Figure 10:
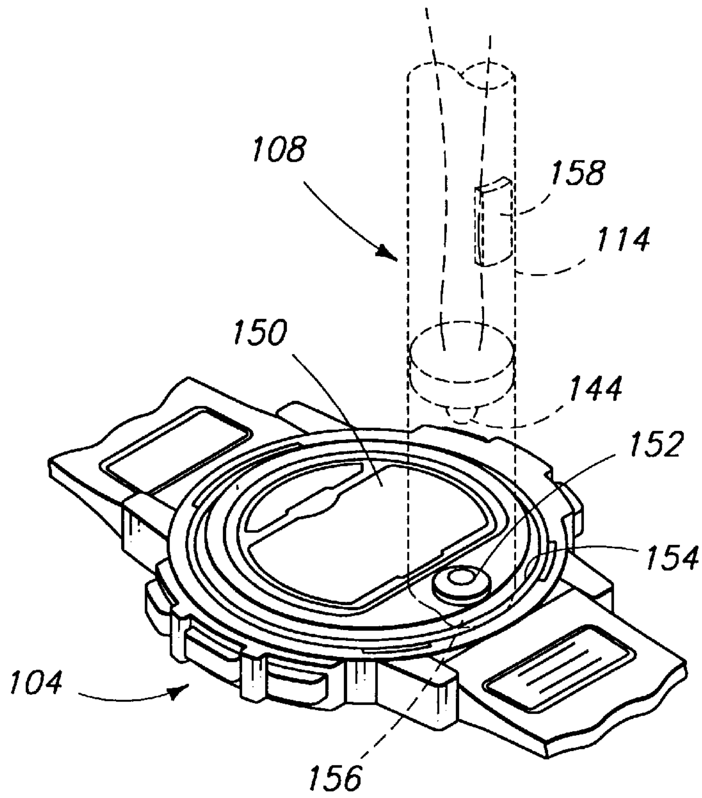
FIG. 10 is a top perspective view of a watch and light wand in accordance with said one embodiment of the invention.

As best shown in FIG. 10, watch 104 has an irregular or non-planar surface about the optical sensor. More specifically, watch 104 has an upper surface 150 in which its optical sensor 152 is positioned. This surface has a circular outer periphery. A circular recess or trough 154 surrounds upper surface 150 just outside its outer periphery and adjacent optical sensor 152. Open distal end of hand-held housing 114 has a shape which is complementary to the irregular surface about optical sensor 152. The wand is formed with a protrusion 156 which extend down into trough 154 to positively register wand 108 with the non-planar surface of watch 104 and to thereby align LED 144 relative to optical sensor 152 of watch 104. This reduces any problems a user might have in determining where to locate the LED relative to the optical sensor of the watch. Other methods of registering wand 108 with watch 104 could optionally be employed. The LED is preferably positioned within the cylindrical housing of wand 108 to be about one inch from the optical sensor when the wand is registered against the watch.

Wand 108 further includes a depressible button or momentary contact switch 158 on housing 114. This button is operably connected through flexible cable 112 to signal the computer to initiate optical transfer of the binary data stream.

In use, a user initially configures computer 102 for data transfer. The user then holds wand 108 against the face of watch 104, with protrusion 156 registered and positioned in trough 154, and then presses button 158 to begin data transfer. It has been found that this feature reduces or eliminates data transfer errors attributable to LED mis-positioning.

Figure 11:
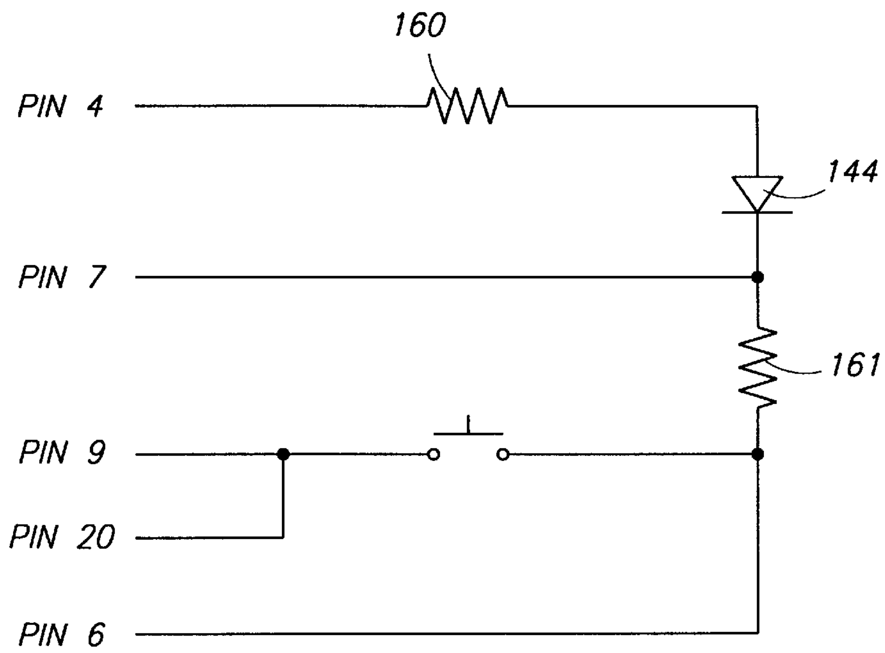
FIG. 11 is a schematic diagram of a light wand and associated adapter in accordance with said one embodiment of the invention.

Referring now to the schematic of FIG. 11, the anode of LED 144 is connected through a first resistor 160 to pin 4 of a DB-25 connector (not shown). Pin 4 of a DB-25 connector corresponds to the data-bit-1 line of an industry-standard parallel printer interface. It is configured as an output by computer 102 and can thus be switched on and off at any time by computer 102 to switch LED 144 on and off. Pin 4 of a DB-25 connector also corresponds to the RTS (ready-to-send) line of an industry-standard serial printer interface. The RTS line is a control output line which can similarly be accessed and switched at any time by computer 102 through its UART, simply by writing to a register of the UART.

The cathode of LED 108 is connected directly to pin 7 of the DB-25 connector. This corresponds to the data-bit-5 line of a parallel printer interface, which is configured by computer 102 as an output. The computer is programmed to fix this line at a low value to act as a ground or low voltage source for LED 144 when wand 108 is connected to the parallel printer interface. Pin 7 also corresponds to the GND (ground) line of the serial printer interface.

One terminal of button switch 158 is connected to both of pins 9 and 20 of the DB-25 connector. Pin 9 corresponds to the data-bit-7 line of a parallel printer interface (configured as an output), and pin 20 corresponds to the DTR (data terminal ready) control output line of a serial printer interface. These output lines are set high by computer 102 so that they function as high voltage sources. The other terminal of button 158 is connected through a resistor 161 to pin 7 (which functions as ground) and directly to pin 6. Pin 6 corresponds to the data-bit-4 line of a parallel printer interface and to the DSR (data-set-ready) line of a serial printer interface. These lines are configured as inputs and polled by computer 102 to determine whether button 158 is pressed.

The interconnections shown in FIG. 11 are contained primarily within adapter 110. With this configuration, the adapter can be connected to either a parallel printer interface or to a serial printer interface. In either case, computer 102 can control LED 144 on a real-time basis to produce an edge-based signal as shown in FIG. 3.

Figure 12:
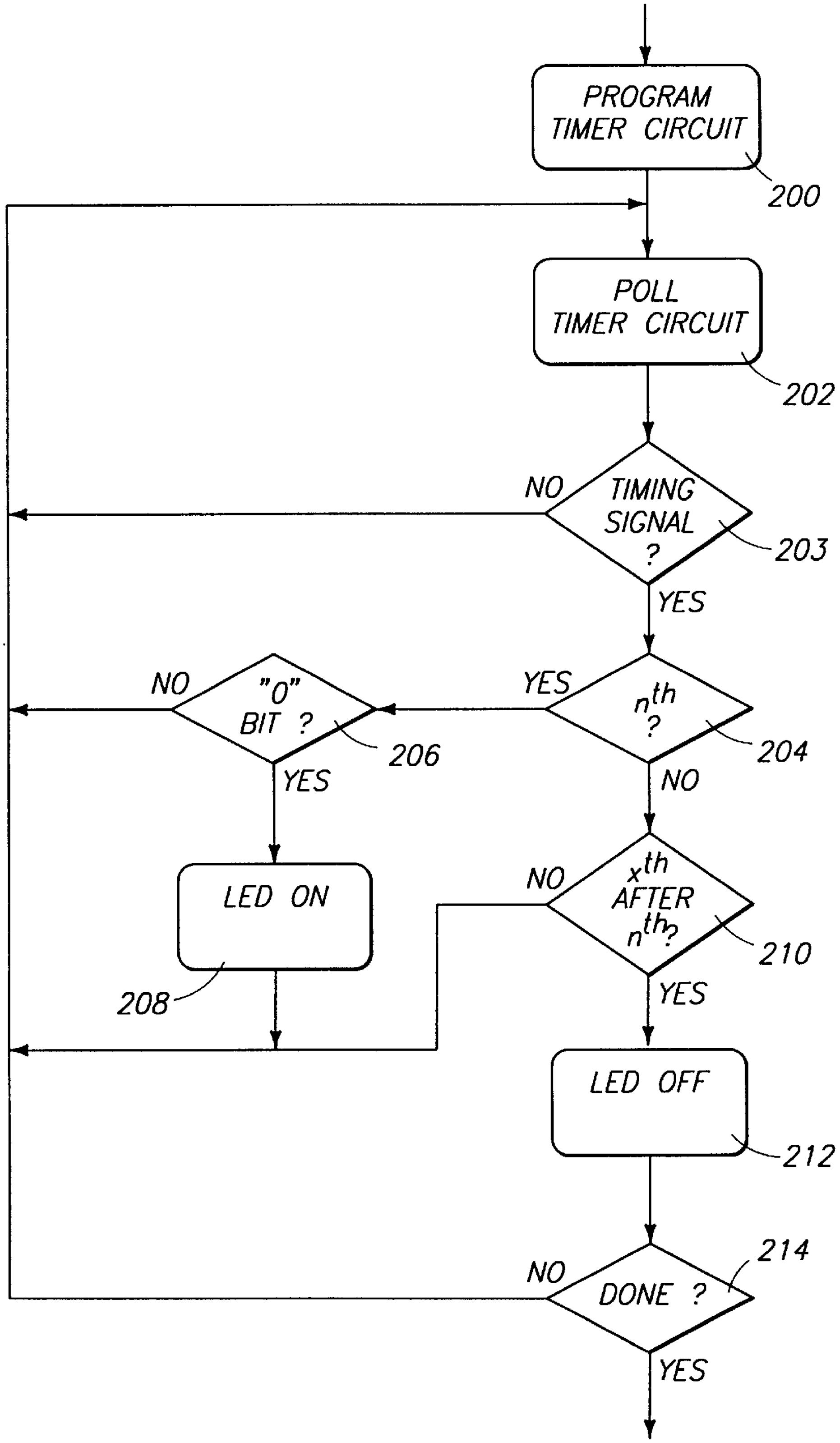
FIG. 12 is a flow diagram showing methodical steps implemented by the system of FIG. 7.

When transferring information, computer 102 runs an application program 131 (FIG. 8) to control the data transfer. The application program implements a method of transferring a binary data stream in a serial, edge-based transmission format. The methodical steps implemented by the application program are shown in FIG. 12.

A first step 200 comprises programming or setting an internal programmable timer circuit, such as timer 130, to generate timing signals at a frequency which is an integer multiple n of the pre-selected bit transmission rate at which watch 104 expects to receive data. As noted above, the bit rate expected by the Timex Data-Link™ watch is currently 2048 bits/second. The occurrences of these timing signals define the mark times, so that every $n^{th}$ timing signal occurs at a mark time, and so that mark times occur at the bit transmission rate in coincidence with the timing signals. A subsequent step 202 comprises polling or monitoring the timing signals with the computer. A decision step 203 comprises determining whether a timing signal has occurred. If it has not, execution returns to step 202. Upon detecting a timing signal, step 204 determines whether it is an $n^{th}$ timing signal, corresponding to a mark time. If it is an $n^{th}$ timing signal, execution proceeds to decision block 206 for determination of whether the next bit to be transmitted has a binary '0' value or a binary '1' value. If the value is '1', no action is taken and execution returns to step 202. If the value is '0', a step 208 of turning on or illuminating LED 144 is executed. LED 144 is turned on via the selected digital output line of computer 102. This generates an optical signal edge.

These steps result in transmitting individual data bits of the binary data stream at corresponding $n^{th}$ timing signals. Transmitting an individual data bit comprises switching the state of the LED 144 from a first to a second of its on and off states to create an optical signal edge at a particular mark time or $n^{th}$ timing signal if and only if the data bit corresponding to said particular $n^{th}$ timing signal has the first binary value. Computer 102 switches LED 144 from off to on only for data bits having the '0' value. Data bits having the '1' value do not result in a signal edge.

Steps 210 and 212 comprise switching the state of the light emitting element back to its first state (off in the embodiment disclosed herein) at an intermediate timing signal which occurs between mark times after the particular $n^{th}$ timing signal but before the subsequent $n^{th}$ timing signal. Specifically, the intermediate timing signal occurs x timing signals after the $n^{th}$ timing signal, where x is less than n. Step 210 determines whether the timing signal detected in step 203 is x timing signals after the last $n^{th}$ timing signal. If not, execution returns to step 202. If the timing signal is x timing signals after the last $n^{th}$ timing signal, step 212 of turning LED 144 off is executed, and execution returns to step 202 for polling the timer again. These steps are repeated for individual bits of the data stream, including start and stop bits, until the data stream has been exhausted as indicated by decision block 214.

Figure 13:
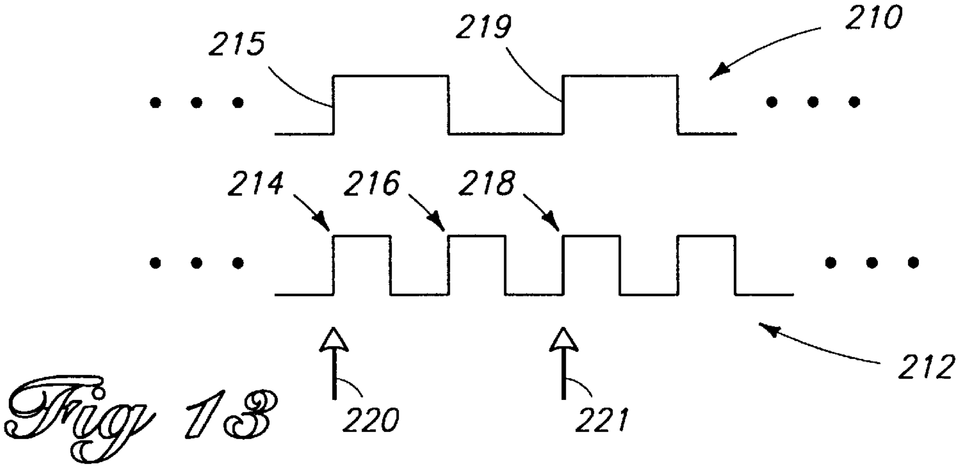
FIG. 13 is a timing diagram showing an example timing signal and edge-based signal in accordance with the invention.

In one embodiment of the invention, n is equal to two and the intermediate timing signal occurs one timing signal after the particular timing signal (x=1). This is illustrated in the timing diagram of FIG. 13, which shows an optical signal 210 resulting from the transmission by computer 102 of two consecutive '0' bits. Timing signals 212 generated by timer circuit 130 are shown below signal 210. Mark times are again illustrated by vertical arrows beneath the timing signals. At a first timing signal 214 which occurs at a first mark time 220, computer 102 transmits the first '0' bit by switching the LED 144 on and creating a first rising edge 215. Computer 102 continues to monitor the timing signals. The next, second timing signal 216 occurs prior to the next mark time. Upon detecting this intermediate timing signal, computer 102 switches LED 144 back off. Since n is equal to two in this case, computer 102 then monitors the timing signals, waiting for the $n^{th}$ or second timing signal after first timing signal 214, referenced by numeral 218. Timing signal 218 occurs at a second mark time 221. Upon detecting timing signal 218, computer 102 repeats the process of switching LED 144 on and then back off to create a pulse with a rising edge 219. If the bit to be transmitted were to have a binary value of '1', computer 102 would simply skip the step of switching LED 144 on.

Figure 14:
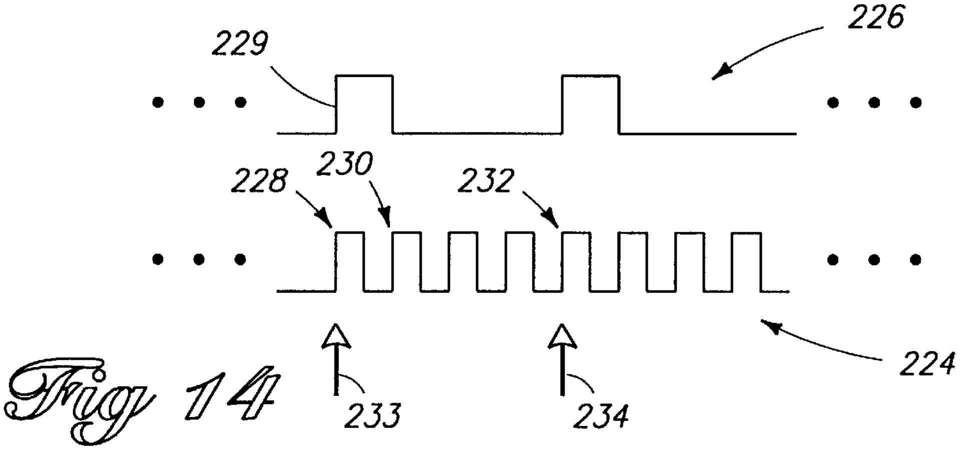
FIG. 14 is a timing diagram showing another example timing signal and edge based signal in accordance with the invention.

In another embodiment of the invention, n is equal to four. The intermediate timing signal, however, still occurs one timing signal after each $n^{th}$ timing signal. This is illustrated in the timing diagram of FIG. 14, where the timing signal is referenced by the numeral 224 and the optical signal is referenced by the numeral 226. At a first timing signal 228 which occurs at a first mark time 233, computer 102 transmits the first '0' bit by switching the LED 144 on, thereby creating a an optical pulse with a leading edge 229. Computer 102 continues to monitor the timing signals. The next, second timing signal 230 occurs prior to the next mark time 234. Upon detecting this intermediate timing signal, computer 102 switches LED 144 back off. Computer 102 then monitors the timing signals, waiting for the next $n^{th}$ or fourth timing signal after first timing signal 224, referenced by numeral 232. Timing signal 232 occurs at a second mark time 234. Upon detecting timing signal 232, computer 102 repeats the process of switching LED 144 on and then back off.

In another embodiment of the invention, not illustrated, n is equal to sixteen. The intermediate timing signal in this embodiment occurs three timing signal after each $n^{th}$ timing signal. This results in a data signal having a duty cycle of $3/16^{ths}$ (each optical pulse is present for $3/16^{ths}$ of the total bit time).

Figure 16:
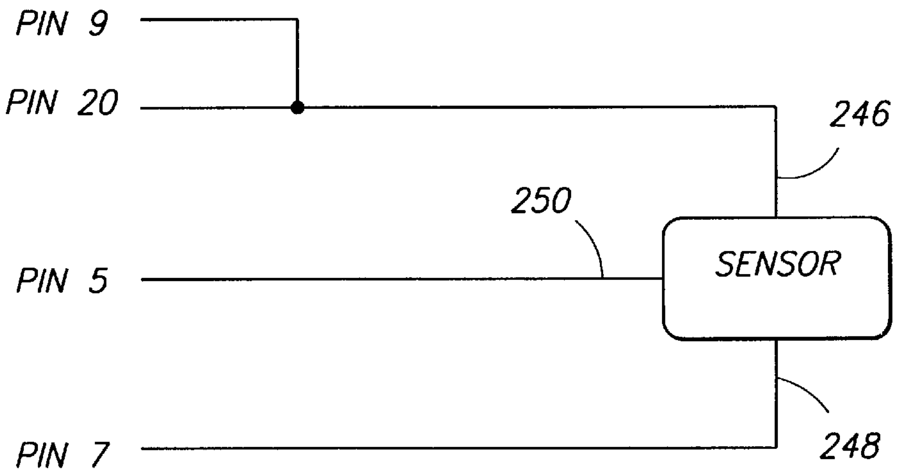
FIG. 16 is a schematic diagram of the light wand of FIG. 15 and its associated adapter.

FIG. 16 shows a still further embodiment of the invention in which a wand 240 has both a light emitting element and its own optical sensor 242 for receiving a binary optical signal from an external source. Wand 240 is similar to wand 108, already described, and the same reference numerals are therefore used to designate identical components of the two embodiments. Wand 240 is used for bi-directional data transfer. Optical sensor 242 is connected through flexible cable 112 to adapter 110, which is in turn connected to a digital input line of computer 102. Through such a connection, computer 102 can monitor the on and off states of the optical signal received by the optical sensor at any time when the adapter is connected to either the parallel or the serial printer interface.

Figure 15:
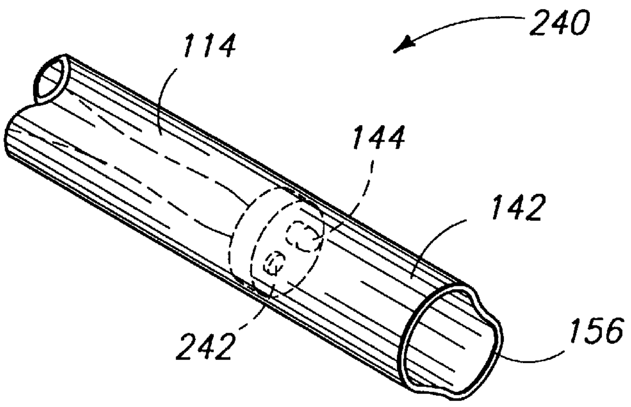
FIG. 15 is a distal-end perspective view of an alternative-embodiment light wand in accordance with the invention.

FIG. 15 shows the electrical connections of optical sensor 242 in more detail. Optical sensor 242 is a three-terminal device, having a power terminal 246, a ground terminal 248, and a signal output terminal 250. Power terminal 246 is connected to pins 9 and 20 of the adapter's DB-25 connector. As already discussed, these pins are fixed at a high voltage to provide power to optical sensor 242. Ground terminal 248 is connected to pin 7, which is fixed at a low voltage as already described. Signal output terminal 250 is connected to pin 5. Pin 5 corresponds to data-bit-3 in a parallel printer interface. Data-bit-3 is configured as an input so that computer 102 can monitor the state of a received optical signal. Pin 5 corresponds to the CTS (clear-to-send) control line of a serial printer interface. Computer 102 can similarly monitor this line to determine the state of a received optical signal.

Reception of a data stream using wand 240 occurs in an analogous manner to transmitting data. A computer application program monitors the timing signals generated by timer circuit 130 and polls the digital input line associated with the optical sensor. The line is polled at least every $n^{th}$ timing signal to detect signal edges of the optical signal at the mark times. Preferably, the application program polls the digital input line at every $n^{th}$ timing signal and at at least one timing signal following every $n^{th}$ timing signal. Even more preferably, the application program polls the digital input line at every timing signal to detect rising edges of an incoming optical signal and to relate those rising edges to the mark times which occur at the selected bit rate.

The various aspects and features of the invention described above allow a single, inexpensive device to be used for transferring information to a portable information device when it is not practical to complete such transfer using a CRT monitor. Even though the receiving device expects a signal of a type which cannot be automatically generated by the serial printer interface of a conventional desktop computer, the same device can be plugged into either a serial printer interface or a parallel printer interface to generate this specialized signal. Additionally, no conversion electronics are required to produce the specialized signal. As a further enhancement, the light wand of the invention reduces the difficulties users might have otherwise had in correctly positioning an LED relative to a portable information device to accomplish data transfer. It is believed that these features will significantly increase the value and user friendliness of data transfer systems such as those used in conjunction with the Timex® Data-Link™ watch.

It is to be expressly understood that the claimed invention is not limited to the disclosed embodiments but encompasses other alternate embodiments that fall within the scope of the appended claims.

We claim:

1. A system for optically transmitting a first edge-based serial data bit stream at a predetermined bit transmission rate, wherein a first binary value is represented by the presence of an optical signal edge at a mark time and a second binary value is represented by the absence of an optical signal edge at a mark time, the system comprising:

a UART having a serial output line that generates a level-based serial output signal, the UART having a control output line other than the serial output line, wherein the control output line can be inverted at any time;

a first light emitting element, operably connected to the control output line of the UART, for optically transmitting the first edge-based serial data bit stream;

a programmable timer that generates timing signals at a frequency which is an integer multiple of the bit transmission rate, wherein mark times occur at said bit transmission rate in coincidence with respective timing signals;

programmable means responsive to said timing signals for inverting the control output line to generate optical signal edges at corresponding mark time when data bits to be transmitted at the mark times have the first binary value, the optical signal edges forming the first-edge-based serial data bit stream.

2. The system of claim 1, wherein the programmable means does not invert the control output line when data bits to be transmitted have a second binary value.

3. The system of claim 1, wherein the control output line of the UART is a ready-to-send control line.

4. The system of claim 1, wherein the control output line of the UART is a data-terminal-ready control line.

5. The system of claim 1, wherein the control output line remains inverted for a programmably determined time to create pulses corresponding to data bits having the first binary value.

6. The system of claim 1, wherein:

the UART has a serial input line that accepts a level-based serial input signal, the UART also having a control input line other than the serial input line, wherein the control input line can be polled at any time;

the system further comprises a first optical sensor, operably connected to the control input line for receiving a second serial data bit stream transmitted by a second light emitting element; and programmable means for polling said control input line at least every said mark time to detect optical signal edges in the second serial data bit stream, and wherein each data bit received in the second serial data bit stream is assigned said first binary value when an optical signal edge is detected at a particular mark time, and assigned said second binary value when an optical signal edge is not detected at the particular mark time.

7. The system of claim 6, wherein the programmable means polls the digital input line at every n and n+1 timing signals to detect the optical signal edges near said mark times.

8. The system of claim 6, wherein the programmable means polls the digital input line at every timing signal to detect the optical signal edges near said mark times.

9. The system of claim 6, wherein the first serial data bit stream is optically received by a portable device including a digital processor.

10. The system of claim 9, wherein said portable device further comprises:

a second optical sensor, operably connected to a digital input line of said digital processor, for receiving said first serial data bit stream;

a timer circuit for generating timing signals at a frequency of at least that of said mark time; and means for assigning, to each data bit in the received data bit stream, said first binary value when said optical signal edge is detected, and said second binary value when said optical signal edge is not detected.

11. The system of claim 10, wherein said portable device further comprises a second light emitting element for transmitting said second serial data bit stream.

12. The system of claim 1, further comprising an adapter that connects to the UART, the first light emitting element being connected to the adapter.

13. A system for optically transmitting a first edge-based serial data bit stream at a predetermined bit transmission rate, wherein first binary valued in the data bit stream are represented by the presence of optical signal edges at corresponding mark times, the system comprising:

a computer having a data processor, a peripheral device interface, and a programmable timer;

the peripheral device interface having a serial output line that generates a level-based serial output signal, the peripheral device also having a control output line other than the serial output line, wherein the control output line can be inverted at any time;

a light emitting element, operably connected to the control output line of the peripheral device interface, for optically transmitting the first edge-based serial data bit stream;

the data processor being programmed to perform the following steps:

setting the programmable timer to generate timing signals at a frequency which is an integer multiple of the bit transmission rate, wherein the mark time occur at said pre-selected bit transmission rate in coincidence with respective timing signals;

monitoring the timing signals;

inverting the control output line in response to the timing signals to generate optical signal edges at mark times when correspond data bite have the first binary value.

14. The system of claim 13, wherein the peripheral device interface is a UART.

15. A system as recited in claim 13 wherein a given mark time is followed by a subsequent mark time, the data processor being further programmed to perform a step of inverting the control output line again in response to a timing signal that occurs after the given mark time but before said subsequent mark time.

16. The system of claim 13, further comprising an adapter that connects to the peripheral device interface, the light emitting element being connected to the adapter.

17. A method for optically transmitting a first edge-based serial data bit stream from a computer at a predetermined bit transmission rate, wherein first binary values in the data bit stream are represented by the presence of optical signal edges at corresponding mark times, the computer having a peripheral device interface and a programmable timer, the peripheral device interface having a serial output line that generates a level-based serial output signal, the peripheral device also having a control output line other than the serial output line, wherein the control output line can be inverted at any time, the method comprising the following steps:

operably connecting a light emitting element to the control output line of the peripheral device interface;

using the programmable timer of the computer to generate timing signals at a frequency which is an integer multiple of the bit transmission rate, wherein mark time occurs at said pre-selected bit transmission rate in coincidence with respective timing signals;

in response to said timing signals, inverting the control output line to generate optical signal edges at mark times when corresponding data bite have the first binary value.

18. The method of claim 17, further comprising a step of not inverting the control output line at mark times when corresponding data bite have a second binary value.

19. The method of claim 17, wherein the peripheral device interface is a UART, and the control output line is a ready-to-send control line of the UART.

20. The method of claim 17, wherein the peripheral device interface is a UART, and the control output line is a data-terminal-ready control line of the UART.

21. The method of claim 17, comprising a further step of leaving the control output line inverted for a programmably determined time.

22. The method of claim 17, wherein a given mark time is followed by a subsequent mark time, the method further comprising inverting the control output line again in response to a timing signal that occurs after the given mark time but before said subsequent mark time.

23. The method of claim 17, wherein the peripheral device interface has a serial input line that accepts a level-based serial input signal, the peripheral device interface also having a control input line other than the serial input line, wherein the control input line can be polled at any time, the method further comprising:

operably connecting an optical sensor to the control input line of said peripheral device interface;

optically receiving a second edge-based serial data bit stream at the optical sensor; and polling the control input line at least every mark time to detect optical signal edges; assigning each data bit received in the second edge-based serial data bit stream said first binary value when an optical signal edge is detected ata corresponding mark time, and said second binary value when an optical signal edge is not detected at a corresponding mark time.

24. The method of claim 23, further comprising performing the polling step at every n and n+1 said timing signals to detect optical signal edges near the mark times.

25. The method of claim 23, further comprising performing the polling step at every said timing signal to detect optical signal edges near the mark times.

26. The method of claim 23, further comprising a step of optically receiving the first edge-based serial data bit stream by a portable device including a digital processor.

* * * * *